(12) United States Patent
Naughton

(10) Patent No.: US 8,528,977 B2
(45) Date of Patent: Sep. 10, 2013

(54) MECHANISM FOR A VEHICLE SEAT FOR ADJUSTING THE ANGLE OF INCLINATION

(75) Inventor: Michael Naughton, Stolzenau (DE)

(73) Assignee: Faurecia Autositze GmbH (DE)

( * ) Notice: Subject to any disclaimer, the term of this patent is extended or adjusted under 35 U.S.C. 154(b) by 735 days.

(21) Appl. No.: 12/731,258

(22) Filed: Mar. 25, 2010

(65) Prior Publication Data

US 2010/0244528 A1 Sep. 30, 2010

(30) Foreign Application Priority Data

Mar. 28, 2009 (DE) .......................... 10 2009 015 463

(51) Int. Cl.
*B60N 2/00* (2006.01)

(52) U.S. Cl.
USPC ................ 297/354.12; 297/366; 297/367 R

(58) Field of Classification Search
USPC .......................... 297/366, 367 R, 354.12, 362
See application file for complete search history.

(56) References Cited

U.S. PATENT DOCUMENTS

| | | | | |
|---|---|---|---|---|
| 6,023,994 A | * | 2/2000 | Yoshida | 74/530 |
| 6,092,874 A | * | 7/2000 | Kojima et al. | 297/367 R |
| 6,474,740 B1 | * | 11/2002 | Kondo et al. | 297/367 R |
| 7,300,109 B2 | * | 11/2007 | Hofmann et al. | 297/362 |
| 7,578,556 B2 | * | 8/2009 | Ohba et al. | 297/366 |
| 7,874,622 B2 | * | 1/2011 | Okazaki et al. | 297/367 R |
| 8,002,353 B2 | * | 8/2011 | Yamada et al. | 297/366 |
| 8,251,451 B2 | * | 8/2012 | Dziedzic | 297/367 P |
| 2008/0174163 A1 | * | 7/2008 | Kojima et al. | 297/367 |

FOREIGN PATENT DOCUMENTS

WO  WO 2008/086596  7/2008

* cited by examiner

*Primary Examiner* — David Dunn
*Assistant Examiner* — Erika Garrett
(74) *Attorney, Agent, or Firm* — Becker & Stachniak, P.C.; Robert Becker

(57) ABSTRACT

A mechanism for a vehicle seat for adjusting the angle of inclination, and a hub-shaped centering means. The mechanism includes a first arresting fitting, a transfer means, rotatable about an axis of rotation, for release of the first arresting fitting, and a centering means, disposed between the first arresting fitting and the transfer means, configured to center the transfer means in a starting position and, against a return force, to enable a rotation about the axis of rotation and relative to the first arresting fitting out of the starting position about a first angular range in the first direction, and about a second angular range in a second direction.

13 Claims, 4 Drawing Sheets

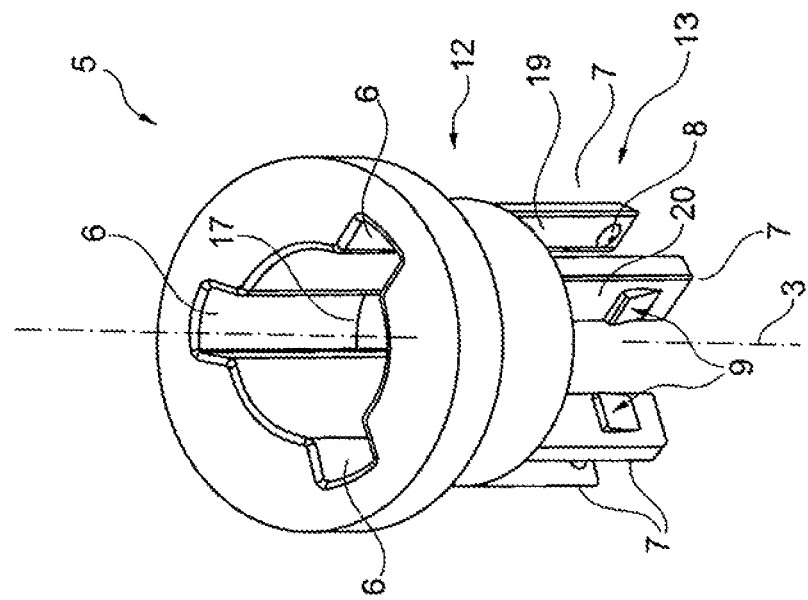
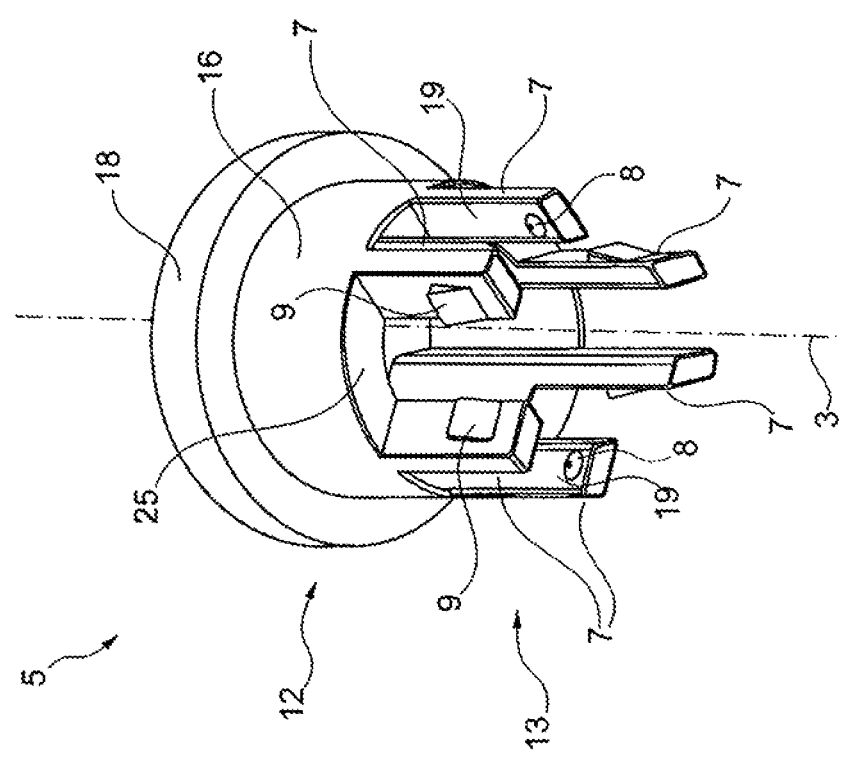

MECHANISM FOR A VEHICLE SEAT FOR ADJUSTING THE ANGLE OF INCLINATION

The instant application should be granted the priority date of Mar. 28, 2009, the filing date of the corresponding German patent application 10 2009 015 463.9.

BACKGROUND OF THE INVENTION

The present invention relates to a mechanism for a vehicle seat for adjusting the angle of inclination, and also relates to a hub-shaped centering means that can be used as a component of a mechanism for adjusting the angle of inclination.

A mechanism for adjusting the angle of inclination between a backrest and a seat of a vehicle seat is disclosed in WO 2008/086598 A1. The mechanism includes two locking fittings or recliners that connect the seat and backrest so that they are pivotable relative to one another. By unlocking the locking fittings, the backrest can be adjusted relative to the seat. By locking the locking fittings, the angle of inclination of the backrest relative to the seat is fixed. To enable a common unlocking of the two locking fittings, the locking fittings are interconnected by a rigid transfer rod that is rotatable about an axis of rotation. By rotating the rod, both the first as well as the second locking fitting are unlocked. This enables actuation of both locking fittings with only a single handle.

The mechanism for adjusting the angle of inclination disclosed in the aforementioned publication has the underlying problem that in the event that during assembly of the seat the locking fittings, and the transfer rod connected therewith, are not ideally arranged, the result can be a binding and a resulting difficulty of movement of the actuation of the locking fittings. A further possible result is that after unlocking of the locking fittings, they do not return to their common locking position. To solve this problem, the aforementioned mechanism for adjusting the angle of inclination includes a sleeve-like spring element of metal that is disposed between the transfer rod and one of the two locking fittings. The spring element biases the one locking fitting against the transfer rod in order to synchronize the unlocking of the two locking fittings. Furthermore, the spring element ensures a free travel that allows the two locking fittings to return into the locking position independently of one another.

It is an object of the present invention to provide a further mechanism for adjusting the angle of inclination for a vehicle seat that eliminates the problem that after a successful unlocking the locking or arresting fittings do not completely return to the locking or arresting position. A further object of the present application is to provide a centering means that can be used as a component of such a mechanism for adjusting the angle of inclination.

BRIEF DESCRIPTION OF THE DRAWINGS

These and other objects and advantages of the present application will appear more clearly from the following specification in conjunction with the accompanying schematic drawings, in which:

FIGS. 2 & 3 show the centering means of the mechanism for adjusting the angle of inclination of FIG. 1 in two different, perspective views.

SUMMARY OF THE INVENTION

Figure 1:
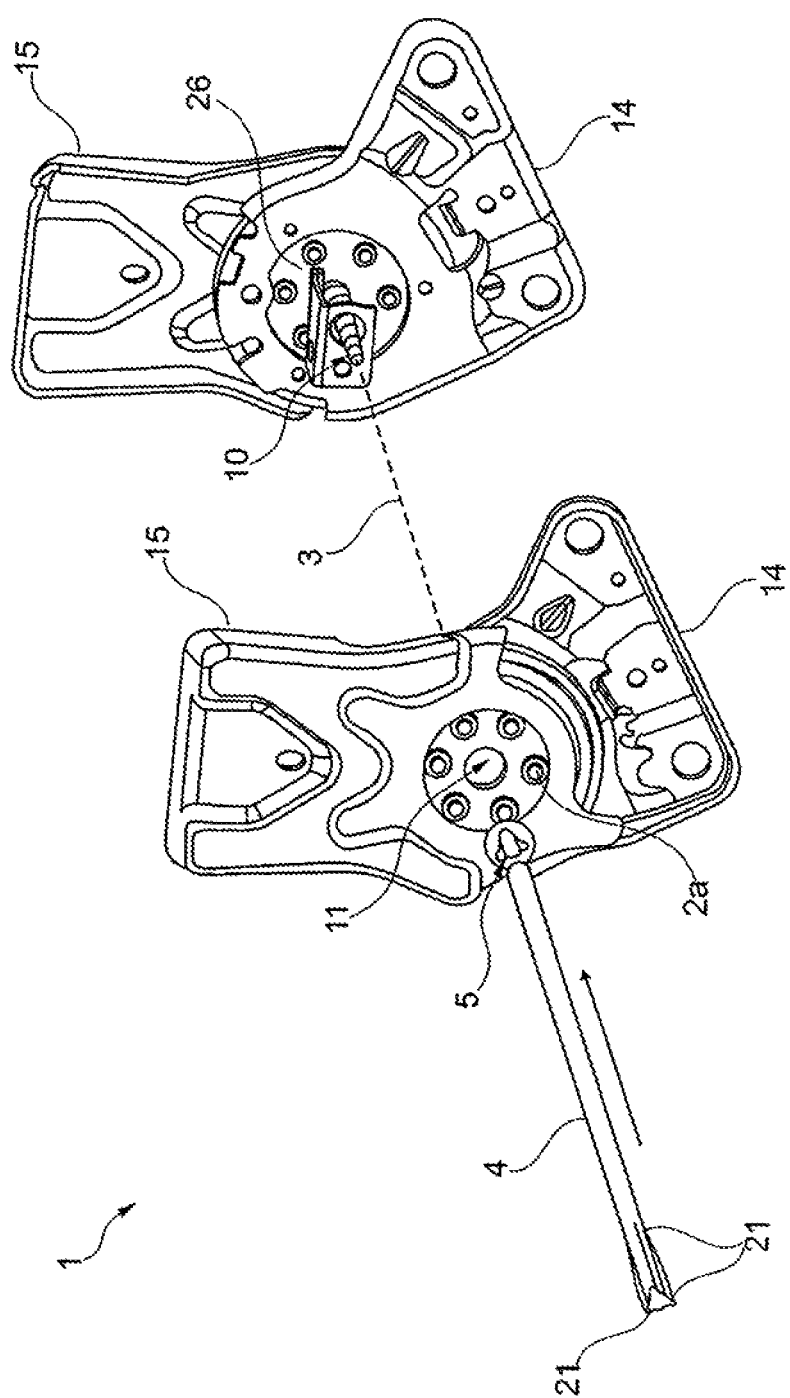
FIG. 1 is an exploded view of one exemplary embodiment of a mechanism for adjusting the angle of inclination pursuant to the present application.
Figure 4:
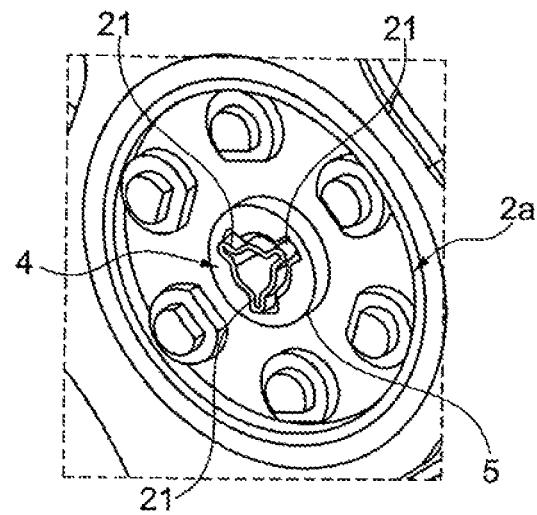
FIG. 4: is a front view of the mechanism for adjusting the angle of inclination illustrated in FIG. 1 in the region of the first arresting fitting, with the centering means and transfer means inserted.
Figure 5:
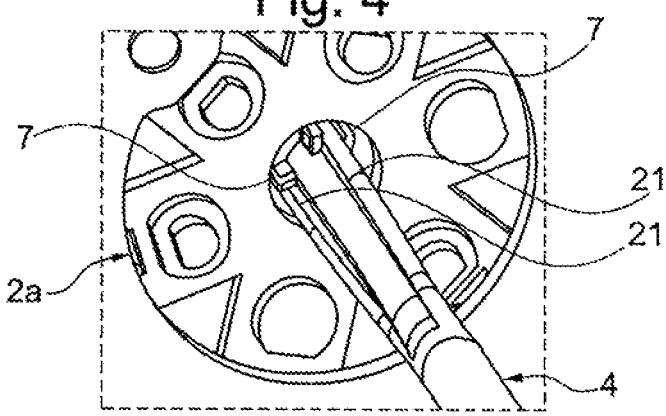
FIG. 5: is a rear view of the mechanism for adjusting the angle of inclination illustrated in FIG. 1 in the region of the first arresting fitting.
Figure 6:
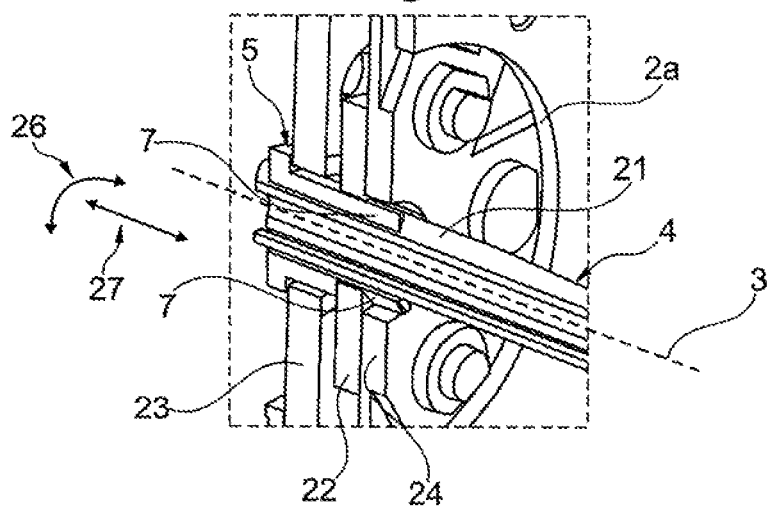
FIG. 6: is a side view in the region of the first arresting fitting with centering means and transfer means inserted, whereby the front half is cut away.

The mechanism of the present application for a vehicle seat for adjusting the angle of inclination comprises a first arresting fitting; a transfer means for a release of the first arresting fitting, wherein the transfer means is rotatable about an axis of rotation; and a centering means disposed between the first arresting fitting and the transfer means, wherein the centering means is configured to center the transfer means in a starting position and, against a return force, to enable a rotation about the axis of rotation and relative to the first arresting fitting out of the starting position about a first angular range in a first direction and about a second angular range in a second direction.

The mechanism of the present application for adjusting the angle of inclination permits a limited rotation of the transfer means relative to the arresting fitting in both directions of rotation. This makes it possible, during installation of the mechanism for adjusting the angle of inclination, to compensate to a certain extent for assembly and manufacturing inaccuracies. To ensure that during installation of the mechanism for adjusting the angle of inclination a limited rotation of the transfer means is possible in both directions of rotation, the transfer means can be returned to the starting position by means of a return force. This compensation in particular ensures that after release, the arresting fittings return to their arresting position. For this purpose, the first and/or second angular range preferably corresponds to at least one adjustment step or stage of the arresting fitting.

The hub-shaped centering means of the present application for placement on a transfer means comprises a first portion having at least one groove for a positive engagement of the transfer means that leaves a certain amount of play, wherein the groove is oriented parallel to the axis of rotation of the centering means; and a second portion disposed adjacent to the first portion along the axis of rotation, the second portion being provided with at least one pair of oppositely disposed, resiliently yielding centering fingers for engaging opposite sides of the transfer means to apply a return force for returning the transfer means into a starting position, wherein the centering fingers are oriented along the axis of rotation and provide a continuation of the groove.

The centering means is preferably made of polymeric material. By the use of a polymeric material, it is possible, for example, to suppress rattling noises of the transfer means.

Further specific features of the present application will be described in detail subsequently.

DESCRIPTION OF SPECIFIC EMBODIMENTS

Referring now to the drawings in detail, the figures show various views of one exemplary embodiment of a mechanism 1 for adjusting the angle of tilt or inclination pursuant to the present application.

The mechanism 1 for adjusting the angle of inclination includes a first arresting fitting 2a, a second arresting fitting 2b, a transfer means 4 that is rotatable about an axis of rotation 3 for the actuation of the first arresting fitting 2a, a centering means 5 disposed between the first arresting fitting 2a and the transfer means 4, a connecting means 10 for the connection of the transfer means 4 with the second arresting fitting 2b, as well as two first adapter elements 14 for the respective securement of the arresting fittings 2a, 2b on a seat frame of a vehicle seat, and two second adapter elements 15 for the respective securement of the arresting fittings 2a, 2b on a backrest frame of a vehicle seat.

The transfer means 4 is embodied as a tube. It is fixedly connected with the connecting means 10, which is embodied in the shape of a rod, with such connection, depending upon the selection of the materials for the transfer means 4 and the connecting means 10, being effected, for example, by means of laser welding, crimping, or a press fit.

The connecting means 10 extends through the second arresting fitting 2b, and is connected with a non-illustrated handle for the actuation of the connecting means 10.

By pivoting or rotating the connecting means 10 about the axis of rotation 3, which is common to the transfer means 4, the second arresting means 2b can be released in a controlled manner. The second arresting fitting 2b is biased in the arresting or locking position, so that after actuation, it automatically returns into the arresting position. The first arresting fitting 2a is embodied in conformity with the second arresting fitting 2b. Such arresting fittings are known to those of skill in the art, thus making it unnecessary to provide a further detailed explanation thereof.

The connecting means is fixed in the axial direction, for example by means of a positive connection, in order to prevent the connecting means from coming out from the second arresting fitting 2b. A rotation of the connecting means 10 is transferred via the transfer means 4 to the first arresting fitting 2a, thus ensuring a common actuation of the first and second arresting fittings 2a and 2b.

The centering means 5 (see also FIGS. 2 and 3) is embodied as a hub-like clip part, and includes a first portion 12 and a second portion 13 that is disposed behind the first portion along the axis 3.

The first portion 12 has a substantially cylindrical shape. It has a cylindrical generated surface 16 and a circular, through opening 17 that extends along the axis 3; three identical grooves or slots 6, which are uniformly distributed about the axis 3 and are oriented parallel to the axis 3, proceed from the opening 17. In addition, the first portion 12, at that end that faces away from the second portion 13, includes a flange-like collar 18 that extends beyond the surface 16.

Figure 7:
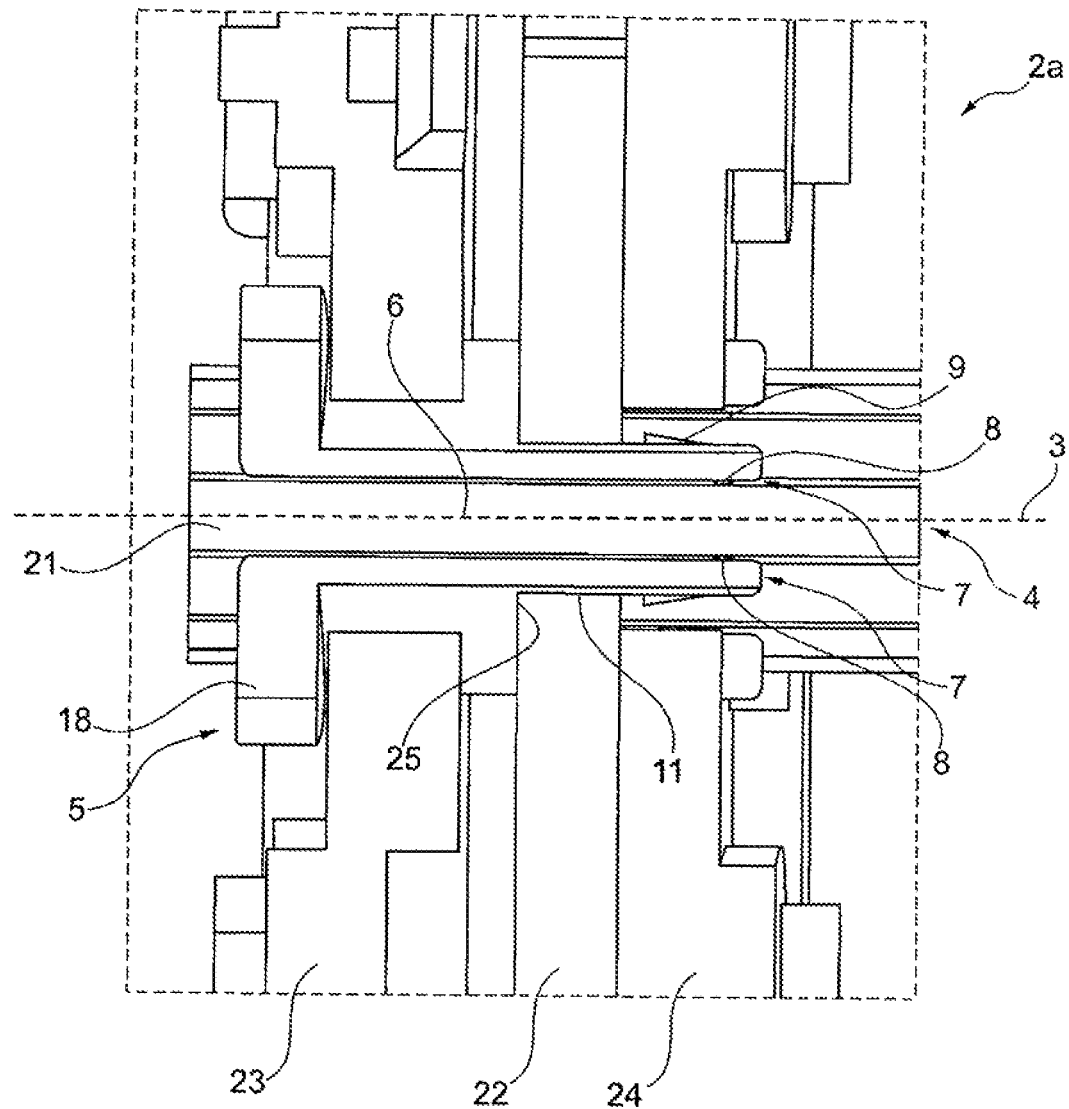
FIG. 7 is a section through the mechanism for adjusting the angle of inclination in the region of the first arresting fitting.

The second portion 13, which directly adjoins the first portion 12, includes three pairs of oppositely disposed, resiliently yielding centering fingers 7 that are oriented along the axis of rotation 3. The centering fingers 7 are arranged in such a way that the inner side of a centering finger 7 is a continuation of a side wall of one of the grooves 6 (see also FIG. 7). In this context, a pair of centering fingers 7 forms an extension of a respective one of the grooves 6. Each centering finger 7, at that end that faces away from the first portion 12, is provided on the inner side 19 with a raised portion 8, here in the form of a hub or knob. The raised portions 8 extend into the intermediate space between a respective pair of centering fingers 7, which intermediate space is formed by the extension of a groove 6; in this way, the raised portions 8 narrow this region. On the outer side 20, which lies opposite the inner side 19, each centering finger 7 includes a hook-shaped projection or detent 9. The centering means 5 is produced of polymeric material, for example as an injection molded part. In principle, the centering means 5 can also be made of some other material, such as metal.

At that end that is disposed in the region of the first arresting fitting 2a, the transfer means 4 is provided with three lug or vane-shaped, identically configured projections 21 that are disposed uniformly about the axis of rotation 3. The projections 21, proceeding from the end of the transfer means 4, in a region intended for the arrangement of the centering means 5, have a constant height. Behind this region, in the direction of the second arresting fitting 2b, the projections 21 flatten out until they reach a point from which the transfer means 4 has a circular profile. The flattening out of the projections 21 facilitates inserting the transfer means 4 through the centering means 5 during assembly of the mechanism 1 for adjusting the angle of inclination. The projections 21 can, for example, be produced by expanding a cylindrical tube that forms the transfer means 4.

The first arresting fitting 2a, the centering means 5, and the transfer means 4 cooperate as follows:

For its release and arresting, the first arresting fitting 2a is provided with a cam 22 that is disposed between a front arresting fitting plate 23 and a rear arresting fitting plate 24. Front arresting fitting plate 23, cam 22, and rear arresting fitting plate 24 are provided in their center with a receiving means 11, which is configured as a continuous opening and into which the centering means 5 can be snapped. FIGS. 4 to 7 show the first arresting fitting 2a with the centering means 5 snapped in. The centering means 5 is positively received by the receiving means 11 not only in the axial direction along the axis 3, but also in the direction of rotation about the axis 3. The positive connection in the direction of rotation is formed by groove-like recesses disposed in the cam 22 and through which a respective pair of centering fingers 7 extends; the positive connection in the axial direction is formed by the hook-shaped projections 9, which extend behind the back side of the cam 22, and by the edge 25 of the first portion 12 of the holding or centering means 5, or of the collar 18 of the centering means 5, which faces the front side of the cam 22 and extends over the front arresting fitting plate 23 (see FIG. 7). As a consequence of the respective positive connection, a rotation of the centering means 5 is transferred onto the cam 22, and the centering means 5 cannot come out of the receiving means 11.

The dimensions of the transfer means 4, with its vane-like projections 21, and of the centering means 5, with the circular opening 17 and the grooves 6, are adapted to one another, so that the transfer means 4 can be inserted through the centering means 5, so that the projections 21 of the transfer means 4 respectively positively engage in a groove 6 of the centering means 5. A certain amount of play is left between the side walls of a groove 6 and a projection 21, which enables a rotation of the transfer means 4 out of the starting position about the axis 3, and about a first angular range in a first direction and about a second angular range in a second direction, before a projection 21 abuts against a side wall of the groove 6. The starting position is prescribed by the central position of a projection 21 in the groove 6. Each of the first and second angular ranges is approximately 2 degrees, whereby this angular range is adapted to the adjustment steps of the arresting fitting 2a, which here is 1.87 degrees. Other values for the angular ranges are in principle also possible. In addition, the first and second angular ranges can also differ from one another, and the starting position can deviate from its central position.

The starting position is prescribed by the raised portions 8 on the inner side 19 of a pair of centering fingers 7. In the inserted state of the transfer means 4, the centering fingers 7 engage under tension on both sides on a projection 21. If the transfer means 4 is rotated relative to the groove 6 out of the starting position about the axis 3 upon the application of an external force, a respective centering finger 7 of a pair of centering fingers yields, accompanied by the formation of a return force. When the external force ceases, the return force presses the transfer means 4 back into its starting position. For the assembly of the mechanism 1 for adjusting the angle of inclination, first the centering means 5 is snapped into the receiving means 11 of the first arresting fitting 2a. Subsequently, the transfer means 4 is inserted through the centering means 5 and is fixedly connected with the connecting means 10, which extends through the second arresting fitting 2b. In this phase of the assembly, the centering means 5 enables the automatic centering of the transfer means 4 in the starting position. During the subsequent assembly of the mechanism 1 for adjusting the angle of inclination, for example at a seat frame, assembly and manufacturing inaccuracies can be compensated for by a rotation of the transfer means 4 out of the starting position within the framework of the first and second angular ranges. This is in particular also the case if the centering means 5 in the direction of rotation is accommodated by the receiving means 11 in a manner nearly free of play.

Due to the fact that the centering means 5 is placed merely upon the transfer means 4, a movement of the transfer means 4 relative to the centering means 5, and hence to the first arresting fitting 2a, is possible in the axial direction 27 (see FIG. 6), as a result of which it is similarly possible to compensate for inaccuracies. A falling or slipping out of the transfer means 4 is prevented by the securement of the transfer means 4 to the connecting means 10.

The transfer means 4, which is inserted through the centering means 5, additionally protects the centering means 5 from falling out of the receiving means 11 in that the projections 21 prevent the centering fingers 7 from springing inwardly to release the interlocking formed by the hook-shaped projections 9 and hence the axial positive connection. If the transfer means 4 is a metal tube, which is preferable, the centering means 4, which is made of polymeric material, then suppresses the production of rattling noises caused by the transfer means 4.

Alternatively, instead of being made as a tube, the transfer means 4 can, of course, also be formed by a rod.

The specification incorporates by reference the disclosure of German priority document 10 2009 015 463.9 filed Mar. 28, 2009.

The present invention is, of course, in no way restricted to the specific disclosure of the specification and drawings, but also encompasses any modifications within the scope of the appended claims.

What I claim is:

1. A mechanism for a vehicle seat for adjusting the angle of inclination, comprising:
   a first arresting fitting;
   a transfer means for a release of said first arresting fitting, wherein said transfer means is rotatable about an axis of rotation;
   a centering means disposed between said first arresting fitting and said transfer means, wherein said centering means is configured to center said transfer means in a starting position and, against a return force, to enable a rotation about said axis of rotation and relative to said first arresting fitting out of said starting position about a first angular range in a first direction, and about a second angular range in a second direction; and
   a second arresting fitting that is connected with said first arresting fitting via said transfer means for a common release of said first arresting fitting and said second arresting fitting.

2. A mechanism for adjusting the angle of inclination according to claim 1, wherein at least one of said first and second angular ranges corresponds to at least one adjustment step of said first arresting fitting.

3. A mechanism for adjusting the angle of inclination according to claim 1, wherein said transfer means is mounted in said centering means so as to be displaceable in both directions axially relative to said axis of rotation.

4. A mechanism for adjusting the angle of inclination according to claim 1, wherein said transfer means and said centering means form a positive connection in the direction of rotation of said transfer means.

5. A mechanism for adjusting the angle of inclination according to claim 4, wherein said centering means is provided with at least one groove that is oriented parallel to said axis of rotation, and wherein said transfer means positively engages into said at least one groove.

6. A mechanism for adjusting the angle of inclination according to claim 1, wherein said transfer means is a tube or a rod.

7. A mechanism for adjusting the angle of inclination according to claim 1, wherein said centering means has a hub-shaped configuration and is placed upon said transfer means.

8. A mechanism for adjusting the angle of inclination according to claim 1, wherein said first arresting fitting has a receiving means, and wherein said centering means is embodied as a clip for a positive snapping into said receiving means.

9. A mechanism for adjusting the angle of inclination according to claim 1, wherein said centering means is provided with at least one pair of resiliently yielding centering fingers for engaging opposite sides of said transfer means in said starting position of said transfer means.

10. A mechanism for adjusting the angle of inclination according to claim 9, wherein at least one of said centering fingers, on an inner side that faces said transfer means, is provided with a raised portion that is adapted to engage said transfer means.

11. A mechanism for adjusting the angle of inclination according to claim 9, wherein at least one of said centering fingers, on an outer side that faces away from said transfer means, is provided with a projection adapted to extend behind said first arresting fitting.

12. A mechanism for adjusting the angle of inclination according to claim 1, wherein said centering means is made of polymeric material or metal.

13. A mechanism for adjusting the angle of inclination according to claim 1, which further comprises a connecting means for connecting said transfer means with said second arresting fitting.

* * * * *